United States Patent [19]
Dorling

[11] 3,857,406
[45] Dec. 31, 1974

[54] VALVE

[75] Inventor: Anthony Dorling, St. Clair Shores, Mich.

[73] Assignee: Ferro Manufacturing Corporation, Detroit, Mich.

[22] Filed: Jan. 2, 1973

[21] Appl. No.: 320,104

[52] U.S. Cl.................. 137/315, 137/375, 251/292, 251/298, 251/306
[51] Int. Cl............................................ F16k 27/00
[58] Field of Search ...... 137/15, 315, 375; 251/291, 251/292, 298, 305, 306, 314

[56] References Cited
UNITED STATES PATENTS

| | | | |
|---|---|---|---|
| 1,977,351 | 10/1934 | Phillips | 251/306 |
| 2,835,268 | 5/1958 | Dillberg et al. | 137/315 |
| 2,867,238 | 1/1959 | Wilfert | 251/305 X |
| 3,143,132 | 8/1964 | Pangburn | 251/306 X |
| 3,724,812 | 4/1973 | Richardson | 251/306 |

*Primary Examiner*—Martin P. Schwadron
*Assistant Examiner*—David R. Matthews
*Attorney, Agent, or Firm*—Whittemore, Hulbert & Belknap

[57] ABSTRACT

A valve assembly comprising a valve body having a cylindrical chamber therein, a shaft extending diametrically across the chamber, and a flattened substantially elliptical valve on said shaft. Either the valve body or the valve, or both, are formed of elastically deformable material. Preferably, the valve chamber is provided with a separate generally cylindrical elastically deformable liner. The valve has a centrally located opening extending therethrough from edge to edge. The valve assembly is assembled by positioning the valve in the chamber and by inserting the shaft through an opening in the valve body into the chamber, through the valve and into an opening in the valve body at the opposite side of the chamber. The elasticity of the valve body and valve is such as to permit longitudinal insertion of the shaft and to also provide a driving engagement between the shaft and valve and to provide an efficient shaft bearing by the valve body after the shaft has been inserted. In addition, the relatively softer liner provides an effective seal around the shaft, and an efficient sealing action with the valve.

10 Claims, 7 Drawing Figures

PATENTED DEC 31 1974 3,857,406
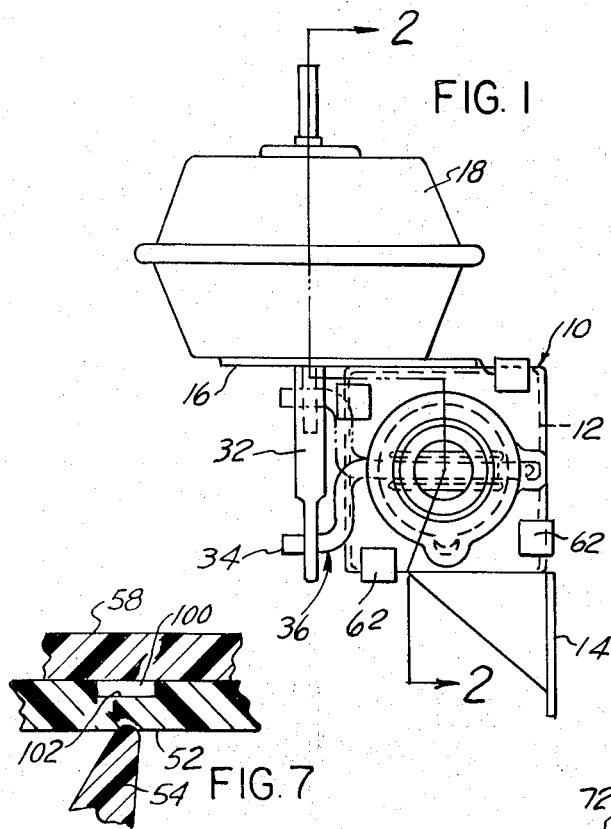
FIG. 1
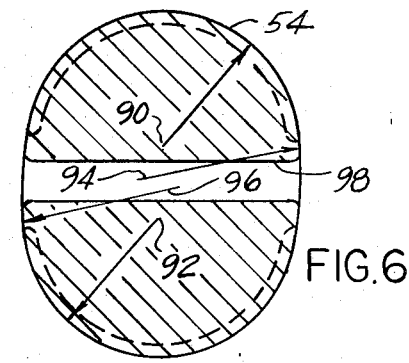
FIG. 6
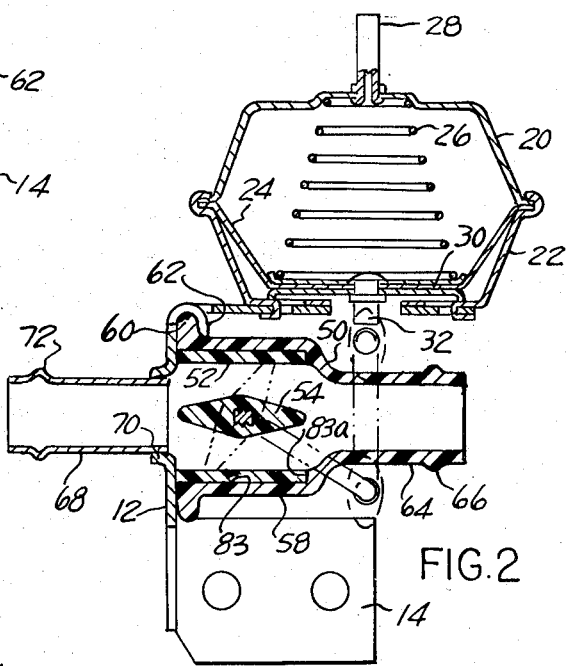
FIG. 7
FIG. 2
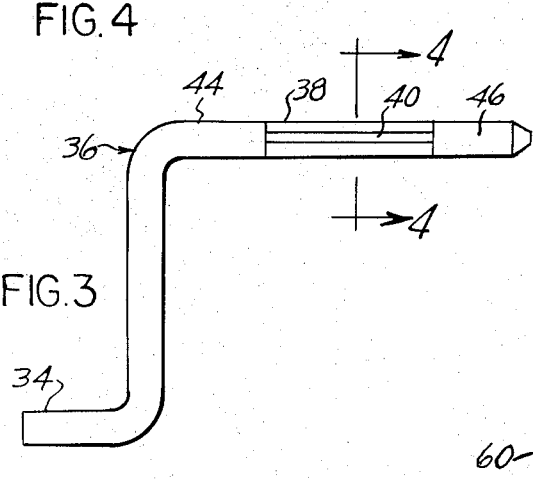
FIG. 4
FIG. 3
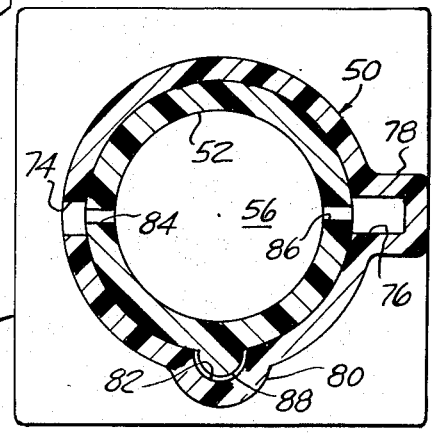
FIG. 5

VALVE

BRIEF SUMMARY OF THE INVENTION

The valve assembly comprises essentially a valve body providing a chamber having a cylindrical portion provided at diametrically opposite sides thereof with shaft receiving openings, one of which is preferably, although not necessarily, closed at its outer end. The valve chamber also preferably includes a generally cylindrical seal or liner having shaft receiving openings therethrough.

The valve is of generally flattened substantially elliptical configuration and is adapted to sealingly engage around the chamber when rotated to an inclined closing position. In open position the valve extends generally parallel to the direction of flow and is streamlined in cross-section to minimize resistance to flow. The valve is formed of elastically deformable material and has an opening extending transversely therethrough from edge to edge adapted to receive an intermediate portion of a pivot shaft. The intermediate portion of the pivot shaft is noncircular in cross-section, preferably serrated, and preferably provided with serrations the tips of which lie outside the cylindrical envelope defined by end portions of the shaft. The material of the valve and body is such as to permit movement of the shaft longitudinally through the openings therein, but in the case of the valve, to remain tightly engaged with the serrated intermediate portion to provide a firm driving interconnection between the shaft and valve. At the same time the material of the valve body surrounding the opening through the wall into the chamber is adapted to yield to permit passage of the serrated intermediate portion of the shaft therethrough. The material of the liner is relatively soft and closes elastically upon the cylindrical portion of the shaft in sealing engagement therewith.

The outer end of the shaft is shaped to form a crank for actuation by suitable means such for example as a vacuum actuated operator.

BRIEF DESCRIPTION OF THE DRAWINGS

FIG. 1 is an elevational view of the valve assembly including the actuator.

FIG. 2 is a sectional view on the line 2—2, FIG. 1.

FIG. 3 is an enlarged view of the actuating crank including the shaft portion.

FIG. 4 is an enlarged sectional view of the shaft taken on the line 4—4, FIG. 3.

FIG. 5 is an enlarged sectional veiw through the valve body and liner.

FIG. 6 is an enlarged sectional view taken through the median plane of the valve.

FIG. 7 is an enlarged detail, in section, of a modified construction.

DETAILED DESCRIPTION

Referring first to FIGS. 1 and 2, the valve assembly comprises a mounting bracket 10 having a generally square plate portion 12 to which the valve body is assembled, as will later be described. The bracket is formed from flat material and is adapted to be bent to provide a mounting bracket 14 and a shelf 16 for supporting the vacuum actuator indicated generally at 18.

While the vacuum actuator forms no part of the present invention it may be noted that it comprises a pair of cups 20 and 22 containing flexible diaphragm 24 urged downwardly by a compression spring 26. A vacuum connection 28 evacuates the chamber formed by the cups and air pressure lifts plates 30 connected to the diaphragm and to an external actuating rod 32.

The rod 32 is connected at its lower end to a crank arm 34 of a lever indicated generally at 36, details of which are best seen in FIG. 3. The lever 36 includes a shaft portion about which the lever rotates, the shaft portion including an intermediate central driving portion 38 having longitudinal serrations 40 and 42 thereon as indicated in FIG. 4. At opposite ends of the serrated intermediate portion 38 the shaft comprises cylindrical portions 44 and 46 which may conveniently be of the same diameter. In fact, the lever 36 may conveniently be formed from cylindrical stock bent to the illustrated configuration and having the serrations pressed or stamped onto the intermediate portion 38.

Secured to the mounting plate 12 of the bracket, which is generally square in outline, is a sub-assembly made up of the valve body 50, a liner or seal 52, a valve 54, and a lever 36 including the shaft portions thereof 40, 44 and 46 which support the valve 54 for rotation in the cylindrical chamber 56 within the valve body.

Referring now to the valve body 50, this is formed of an elastically deformable material such for example as a suitable polyamide. Excellent results have been obtained when the valve body is formed of hexamethylene adipamide having a hardness of approximately 90–130 Rockwell R. This material is adequately self-supporting but is sufficiently yieldable to provide functions which will later be described. The valve body includes an elongated cylindrical portion 58 terminating at one end in a flange 60 of generally rectangular outline which is adapted to be supported by the generally square plate 12 by suitable bent-over clamps 62. At the opposite end of the generally cylindrical chamber portion of the valve body, the body is reduced to a smaller cylindrical portion 64 provided with a cylindrical bead 66 for attachment to a conduit. A connector tube 68 is suitably secured to a central opening 70 provided in the generally square mounting plate 12 of the bracket and is beaded as indicated at 72 for connection to a second conduit. It will be understood that the valve 54 controls flow through the valve body and through the conduits.

The valve body is provided with an opening 74 which extends completely through a wall thereof, and a second opening 76 which, as illustrated, is closed at its outer end by a projection 78, although it too may be a through opening if desired. The openings 74 and 76 are for the purpose of receiving the shaft portion of the lever 36, as will subsequently be described. The valve body 50 is in addition provided with an elongated rib 80 having a groove 82 therein for a purpose which will presently appear. The groove 82 extends longitudinally throughout the length of the cylindrical chamber portion 58 of the valve body.

The cylindrical chamber portion 58 of the valve body is provided at its interior with a cylindrical enlargement indicated at 83 terminating in a shoulder indicated at 83a.

Received within the cylindrical chamber portion 58 of the valve body 50 is the cylindrical seal or liner 52 which as best seen in FIG. 5, is provided with through shaft receiving openings 84 and 86 which initially are somewhat smaller than openings 74, 76. In addition, the seal 52 is provided with an elongated rib 88 which is received within the groove 82 and constitutes locating means for the combination valve body and seal or liner.

The seal 52 is formed of an elastically deformable material such for example as synthetic rubber of any suitable type having a hardness in the approximate range of 55-85 durometer A, which it will be noted is considerably softer than the material of which body 50 and valve 54 are made.

The valve, details of which are best illustrated in FIG. 6, has a peripheral outline of substantially elliptical shape such that when moved to the inclined dotted line position seen in FIG. 2, the projection of the valve is circular and the valve constitutes a continuous and effective sealing closure completely around the interior of the valve chamber 56. As best seen in FIG. 6, the upper and lower portions of the valve 54 are arcuate struck from centers 90 and 92 respectively, and the side portions are arcuate struck from centers indicated at 94 and 96. The valve is somewhat flattened, as best seen in FIG. 2, and has a thickened central portion through which extends an opening 98 which is initially of cylindrical configuration. The valve, while flattened, is of streamline configuration to incorporate the thickened central portion so as to provide minimum resistance to flow of fluid through the valve.

The valve is formed of a suitable elastically deformable material and may conveniently be formed of the same material as the valve body, having of course the same approximate hardness.

An important feature of the present invention is the relationship between the valve body 50, the seal or liner 52, the valve 54, and the shaft of the lever 36 including its serrated portion 38. These are dimensioned and are formed of materials such that the subassemblies of these parts may be produced by first inserting the seal or liner 52 in the valve body 50 in the relationship best illustrated in FIG. 5. Thereafter, the valve 54 is positioned within the chamber 56 with the opening 98 therethrough in alignment with the openings 74, 84, 86 and the blind opening 76, and with the valve in a predetermined angular position. At this time the end of the shaft portion of the lever 36 is inserted through these openings, while its crank 34 is in the correct angular position to correspond to that of valve 54. From FIG. 4 it will be observed that the crests of the serrations lie outside the cylinder formed by the projections of the cylindrical portions 44, 46. The leading end of the shaft is tapered as best illustrated in FIG. 3 and guides the shaft portion of the lever through the openings until the tapered end is received in the opening 76.

The body 50 is sufficiently yieldable to accept the imprint of the serrated portion of the lever as it passes through the opening 74 thereof, while having sufficient resilience or elasticity to provide a smooth bearing surface for the shaft portion of the lever in final assembled position. It is of course rigid enough to be self-supporting, and to support the valve, valve shaft, and liner or seal in the relationship described.

While the valve body, seal and valve are all elastically deformable, the liner or seal is substantially softer and more readily deformable than said body and valve.

The seal 52 is formed of the relatively soft elastomeric material having a durometer hardness of about 55-85 and is readily yieldable to permit passage through the opening 84 thereof of the enlarged serrated shaft, and thereafter to close elastically onto the cylindrical portion 44 of the shaft to provide an effective seal therewith. Similarly, the opening 86 in the seal is adapted to provide a tight fitting seal on the cylindrical portion 46 of the shaft.

The central opening 98 through the valve is dimensioned so as to have a substantially interference fit with the crests of the serrations 40 and 42, while being sufficiently yieldable to permit longitudinal movement of these serrations therein. Thus, when the shaft has been inserted to final position, the valve 54 is drivingly engaged by the serrations of the intermediate portion of the shaft, and serves the additional function of retaining the crank in proper position in the complete assembly, both angularly with respect to the valve, as well as longitudinally with respect to the valve body. The opening 74 in the valve body 50 is preferably dimensioned to have an interference fit with the crests of the serrations as they are moved therethrough, but to thereafter provide a journal bearing for the cylindrical portion 44 thereof. The sharp crests of serrations 40, 42 move readily through the opening 74, leaving a perceptible imprint therein, but the material of the slightly elastically yieldable valve body 50 nevertheless provides an essentially cylindrical bearing surface for the smooth cylindrical shaft portion 44 after the serrated shaft portion 38 has passed therethrough.

The seal or liner 52 performs three important functions. In the first place, it is yieldingly and elastically engaged by the peripheral portion of the valve to provide a tight and efficient valve closure. Secondly, it tightly engages the cylindrical portions 44 and 46 of the shaft to provide an effective shaft seal. Finally, the length of the seal 52 slightly exceeds the length of the enlargement 83 within the valve body so that the seal, when assembled with the mounting plate 12, is under longitudinal compression between shoulder 83a and mounting plate 12 and provides an effective sealing gasket around the opening 70 through the mounting plate 12.

While the actual numerical values of the dimensions are of course not critical, it is believed instructive to furnish information as to actual dimensions of a successful application of the present invention to a practical valve. The dimensions of the cylindrical portions 44 and 46 of the shaft portion of the lever (or the dimension of the cylindrical stock from which the lever was formed) is about 0.125 inch. The crests of the serrations 40 and 42 lie in an imaginary cylindrical surface having a diameter of about 0.165 inch. The opening 98 through the valve has a diameter of about 0.125 inch. The openings 74 and 76 in the valve body have a dimension of approximately 0.130 inch. The openings 84 and 86 through the seal 52 have an initial diameter of approximately 0.080 inch.

Thus, the cylindrical portions 44 and 46 of the shaft have rotating clearance with the openings 74 and 76 of the valve body 50. On the other hand, the seal 52 tightly engages the cylindrical portions 44 and 46 of the shaft at opposite ends of the serrated portions 38 due to its initial smaller openings 84 and 86. The valve 54 is tightly engaged on the serrations because of the fact that the crests of the serrations extend substantially radially outwardly of the cylindrical opening initially provided therein.

From the foregoing it will be observed that the valve is characterized particularly by the novel cooperation between the seal, the valve, the valve body, and the shaft portion of the actuating lever 36.

The seal, which is formed of a single homogeneous piece of rubber, provides a very effective closure seal with the valve due to the elastic deformability thereof. Secondly, the seal, due to the fact that the shaft receiving openings are initially considerably smaller than the cylindrical portions of the shaft, yield to permit passage of the shaft and particularly, passage of the serrated portion through the opening 84 thereof, after which the openings contract elastically to provide effective shaft seals. Finally, due to the initially greater length of the shaft seal with respect to the recess in the valve body in which it is received, the seal performs a function as a gasket in cooperation with the adjacent surface of the plate 12 of the mounting bracket.

The valve 54, which again is preferably formed of a homogeneous elastically deformable material throughout, has three distinct features. The characteristics of the material are such that the opening through the valve is just sufficiently yieldable to accept an interference fit with the serrated intermediate portion of the lever as it is introduced longitudinally thereinto, and yet is strong enough to prevent rotation therein and to be drivingly engageable by the serrations when the lever is in assembled position. it will further be noted of course that the valve is symmetrical and hence, substantially balanced with respect to fluid pressure. In the second place, the valve is streamlined to provide minimum resistance to fluid flow. In addition, the valve firmly grips the serrations of the shaft and retains the crank in the correct operating position against axial displacement.

A further significant advantage of importance in insuring quick and easy assembly of the parts is that the valve 54 may be positioned in a precisely predetermined angular position, either in fully closed position, where its peripheral surfaces engage around the interior of the liner or seal 52, or in fully open position in which its median plane is parallel to the axis of the chamber 83 and liner or seal 52. The crank arm 34 may then be located in the correct angular position to correspond to the selected valve position. Accordingly, when the assembly is completed by simply pressing the shaft portion of lever 36 into the aligned openings 74, 84, 98, 86 and 76, at which time, the crank and valve are in the proper angular relationship, the lever is supported for rotation on efficient bearing surfaces, and the lever is frictionally locked against withdrawal.

Referring now to FIG. 7, there is illustrated a modification which provides for complete leakproof closure of the valve with reduced valve closing force. The tubular liner or seal 52 is provided at its exterior surface, and in registration with the internal surface area contacted by the periphery of valve 54 when the valve is in the closed position shown in dotted lines in FIG. 2, with a groove 100 leaving a thinned web 102 which is supported along opposite edges so as to be readily bent when engaged by the valve. In practice, a groove 100 having a depth of 0.040 inch and a width of 0.100 inch has proven effective. Since the wall thickness of the liner or seal 52 is about 0.125 inch, the thickness of the flexible web 102 is about 0.085 inch.

What I claim as my invention is:

1. A valve assembly comprising a valve body having a cylindrical chamber therein and having at opposite sides of said chamber a pair of diametrically opposed aligned cylindrical shaft receiving openings, one of said openings being closed at its outer end, a pivot shaft having aligned spaced cylindrical portions in said openings, a valve having a peripheral outline substantially generally in the form of an ellipse fixed to said shaft within said chamber, said valve being flattened and movable between an open position in which it extends generally parallel to the axis of said chamber and an inclined closed position in which its peripheral surface engages the inner surface of said chamber, said valve having a centrally located diametrically extending transverse opening therethrough and at least the portion of said valve provided with said transverse opening being formed of elastically deformable material to provide for insertion of said shaft through one opening in the valve body and the opening through said valve while said valve is located in said chamber, said shaft having a serrated central portion intermediate said spaced cylindrical portions provided with longitudinally extending radially outwardly formed serrations dimensioned relative to the transverse opening through said valve to be slidable therethrough and to deform the material of said valve to establish a driving connection thereto.

2. An assembly as defined in claim 1 in which said shaft is of uniform circular cross-section except for the central portion thereof, which is longitudinally serrated with the crests of said serrations lying outside the projection of the portions of circular cross-section.

3. An assembly as defined in claim 2 in which said valve is formed in its entirety of homogenous elastically deformable material.

4. An assembly as defined in claim 2 in which said body is formed of elastically deformable material.

5. An assembly as defined in claim 4 in which both the opening through the wall of said body through which said shaft is introduced and through said valve are dimensioned to permit longitudinal movement therein of the serrated shaft portion, the said opening in the wall of said body thereafter rotatably supporting said shaft, the opening in said valve conforming in driving relation to said serrations.

6. An assembly as defined in claim 4 in which said chamber includes a generally cylindrical liner formed of elastically deformable material substantially softer than the material of said body.

7. An assembly as defined in claim 6 in which said body has a groove extending longitudinally of said chamber, and said liner has an external rib received in said groove.

8. An assembly as defined in claim 6 in which said liner has shaft receiving openings initially smaller than the openings in said valve body for receiving and sealingly engaging with the spaced cylindrical portions of said shaft.

9. An assembly as defined in claim 8 comprising a bracket supporting said body at one end of said chamber, said body having a recess having a shoulder at one end receiving said liner, said liner having a length normally exceeding the length of said recess, one end of said liner engaging said shoulder and the other end of said liner engaging said bracket in pressure contact and forming a gasket type seal therewith.

10. An assembly as defined in claim 6 in which said liner has a groove formed around its exterior surface at an oblique angle to its axis and occupying the zone opposite to the line of contact between the periphery of said valve and the interior surface of said liner, said groove providing a laterally supported thin flexible web engaged by the periphery of said valve when said valve is in closed position.

* * * * *